United States Patent [19]

Ohkawa

[11] Patent Number: 4,560,528

[45] Date of Patent: Dec. 24, 1985

[54] METHOD AND APPARATUS FOR PRODUCING AVERAGE MAGNETIC WELL IN A REVERSED FIELD PINCH

[75] Inventor: Tihiro Ohkawa, La Jolla, Calif.

[73] Assignee: GA Technologies Inc., San Diego, Calif.

[21] Appl. No.: 367,343

[22] Filed: Apr. 12, 1982

[51] Int. Cl.$^4$ .............................................. G21B 1/00
[52] U.S. Cl. .................................... 376/121; 376/133; 376/142
[58] Field of Search ................ 376/121, 133, 137, 142

[56] References Cited

U.S. PATENT DOCUMENTS

| | | | |
|---|---|---|---|
| 3,194,739 | 7/1965 | Kerst et al. | 376/137 |
| 3,677,890 | 7/1972 | Hartman | 376/137 |
| 3,692,626 | 9/1972 | Ohkawa | 376/137 |
| 4,065,350 | 12/1977 | Sheffield | 376/137 |
| 4,264,413 | 4/1981 | Ohkawa | 376/133 |
| 4,274,919 | 6/1981 | Jensen et al. | 376/133 |
| 4,302,284 | 11/1981 | Ohkawa | 376/133 |

OTHER PUBLICATIONS

I. B. Berstein, et al., "An Energy Principle for Hydrodynamic Stability Problems," Proceedings of The Royal Society of London, A, 244, pp. 17-40, 1958.
H. P. Furth, "Minimum-Average-B Stabilization for Toruses," Advances in Plasma Physics, Simon and Thompson, eds., vol. 1, pp. 67-100, Interscience Publishers 1968.
J. B. Taylor, "Relaxation of Toroidal Plasma and Generation of Reverse Magnetic Fields," Physical Review Letters, vol. 33, No. 19, pp. 1139, 1141, Nov. 4, 1974.
H. A. B. Bodin and A. A. Newton, "Reversed-Field-Pinch Research," Nuclear Fusion, vol. 20, No. 10, pp. 1255-1373, 1980.
R. K. Fisher et al., "Studies of Doublet Plasmas in Doublet IIA," Phys. Rev. Letters, vol. 39, No. 10, pp. 622-625, Sep. 5, 1977.
T. Ohkawa, "Multipole Configurations with Plasma Current", General Atomic Report GA-8528, Feb. 15, 1968.
Project Staff, General Atomic Company, "Doublet III Construction and Engineering Test" and Doublet III Experiment, Magnetic Fusion Energy Program Summary Progress Report, Fusion Division, Oct. 1, 1977-Sep. 30, 1978, General Atomic Report GA-A15232. pp. 2-1 to 3-119. Apr. 1979.

*Primary Examiner*—Sal Cangialosi
*Attorney, Agent, or Firm*—Fitch, Even, Tabin & Flannery

[57] ABSTRACT

A magnetic well reversed field plasma pinch method and apparatus produces hot magnetically confined pinch plasma in a toroidal chamber having a major toroidal axis and a minor toroidal axis and a small aspect ratio. A reversed magnetic field pinch current channel within the plasma and at least one hyperbolic magnetic axis outside substantially all of the plasma form thereby a region of average magnetic well in a region of nested closed magnetic surfaces surrounding the plasma current channel when the magnetic field component in the direction of the hyperbolic magnetic axis is also made to be substantially less than zero in the vicinity of the hyperbolic magnetic axis. The magnetic well reversed field pinch is operated so that reversal of the safety factor q and of the toroidal magnetic field takes place within the plasma, and the plasma so produced closely approximates known theoretical stability conditions. The well-producing plasma cross section shape is produced effectively by an exterior shaping shell assembly. The plasma is formed inside a vacuum chamber and an electrically conducting shaping shell assembly, whose noncircular poloidal cross section imparts the desired shape to the plasma. The shape of the plasma may be maintained and/or adjusted by means of electrical currents driven through appropriately distributed external conductors.

32 Claims, 7 Drawing Figures

METHOD AND APPARATUS FOR PRODUCING AVERAGE MAGNETIC WELL IN A REVERSED FIELD PINCH

BACKGROUND OF THE INVENTION

This invention relates generally to plasma devices and particularly to the confinement and stabilization of plasmas in fusion devices by means of average magnetic well. More particularly, the present invention relates to the combination of plasma cross section shaping and the plasma pinch effect at small aspect ratio for the production of average magnetic well in a toroidal reversed field pinch.

Toroidal plasma devices are devices in which plasma is created in a topologically toroidal space, usually axisymmetric, and is confined therein by appropriate confining magnetic fields. Toroidal plasma devices are useful in the generation, confinement, heating, study and analysis of plasmas. In particular, such devices are useful for the reaction of deuterium and tritium, deuterium and deuterium or other nuclear fusible mixtures, with the production of high energy neutrons and energetic charged particles as products of the nuclear fusion reactions.

The problems in nuclear fusion devices are largely to heat the plasma to a temperature high enough to enable the desired reactions to occur and to confine the heated plasma for a time long enough to release energy in excess of that required to heat the plasma to reaction temperature. The present invention is directed to the magnetic confinement of such plasma and finds particular utility in such devices and their applications, including experimental devices and the use thereof in experimentation and investigation with respect to toroidal plasma devices.

A number of toroidal plasma devices have been suggested and built. The ones most closely related to the present invention are tokamak devices and pinch devices, including reversed field pinch (RFP) devices. In such devices, gas is confined in a toroidal confinement vessel and is heated to form a plasma which is generally held away from the walls of the confinement vessel by appropriate magnetic fields. Such devices are all topologically toroidal and are usually axisymmetric. A topological torus is any geometric solid figure that can be produced by an imagined elastic deformation of an initial circular torus. An axisymmetric torus is obtained by rotating any plane geometric figure about the major toroidal axis. An axisymmetric toroidal device is one in which all quantities are invariant to rotation about the major toroidal axis. A necessary condition for the toroidal magnetic confinement of plasmas is that the complete set of magnetic field components results in a set of nested, toroidally closed magnetic surfaces. A magnetic surface is defined as a mathematical surface on which the magnetic field has no component normal thereto. The magnetic surface enclosing zero volume in the center of the nest is called an elliptic magnetic axis. Most devices have only a single elliptic magnetic axis and a single set of nested surfaces. However, Doublet devices have two elliptic magnetic axes, and multipole devices have two or more sets of nested surfaces.

In some toroidal devices, such as tokamak and pinch devices, the confining magnetic field includes magnetic field components produced by currents flowing through the confined plasma itself. When nested magnetic surfaces are present, this current is significantly concentrated into those magnetic surfaces closer to elliptic magnetic axes. Such regions of greater current density relative to the remainder of the plasma are called current channels.

In those toroidal devices where it is required, a toroidal plasma current is usually produced by a transformer with the toroidal confined plasma acting as the secondary and with the primary being a central solenoid. Upon change of the current in the solenoid, a toroidal electric field is produced to ionize the gas and drive plasma current around the torus.

A pinch effect takes place when electric current flowing through the plasma is acted upon by its own magnetic field to exert a confining pressure on the plasma. The large current simultaneously heats the plasma ohmically. However, this simplest configuration by itself, called the Bennett pinch, is unstable, and most of the plasma soon strikes the confinement vessel, hence cooling the plasma and impeding any reaction. For this reason, additional measures are taken to improve the stability of the system.

The magnetohydrodynamic (MHD) stability of a magnetically confined plasma is dependent on the pitch of the magnetic field lines encircling the magnetic axis or axes. This pitch P is defined by $$P = \lim_{k \to \infty} \frac{\Delta \xi}{2\pi k} \quad (1)$$

where $\Delta \zeta$ is the distance traversed along the direction of the magnetic axis and k the number of times the axis is encircled, both while following a field line. This limit is the same for all possible field lines on a given magnetic surface. In toroidal plasma devices it is customary to use instead the safety factor q where $$q = P/<R>. \quad (2)$$

Here $<R>$ is the average major radius of the magnetic surface in question. R is the major radius measured radially from the major toroidal axis to the magnetic surface. The aspect ratio A of a torus is defined by $A \equiv R_o/a$ where $R_o$ is the major radius to the elliptic magnetic axis and a is the mean minor radius of the plasma surface. For a general topological torus $<R> = <C>/2\pi$, where $<C>$ is the average major circumference of the nonaxisymmetric magnetic surface in question. There is a corresponding relationship between pitch P and safety factor q for still more general systems. In order to be magnetohydrodynamically stable, toroidal plasma devices must satisfy certain necessary conditions on q. If r is the mean minor radius, then these conditions are usually simply stated as:

$$|q| \neq 1; \text{ and} \quad (a)$$

$$s \equiv \frac{r}{q} \oint \frac{dq}{dr} \quad (b)$$

must be large enough to satisfy relevant criteria, including the Mercier and the Robinson criteria; in particular, dq/dr must not change sign within the plasma, and it may be zero only at a magnetic axis. Conditions (a) and (b) taken together for large aspect ratio devices require that in plasmas with current channels, such as tokamaks and pinches, either $|q| \geq 1$ on axis and increases monotonically everywhere else in the plasma; or else $|q| < 1$ everywhere, decreases monotonically with increasing distance from the magnetic axis, passes smoothly through zero, and then increases monotonically with increasing distance from the magnetic axis in the outside regions of the plasma. The $|q| \geq 1$ case is realized in tokamaks, and the $|q| < 1$ case in reversed field pinches. Condition (a) above is usually required to avoid a serious kink instability that arises when $q \approx 1$. A more general criterion for kink mode stability is given by the energy principle of I. B. Bernstein, et. al., in Proceedings of The Royal Society of London, A, 244, (1958), pp. 17–40. For low values of poloidal beta $\beta_p$, defined by $\beta_p \equiv 2\mu_0 \bar{p}/\bar{B}_P^2$, it is possible to find plasma equilibria which are stable to kink modes even when $q=1$. Here $\bar{p}$ and $\bar{B}_P^2$ are the average over the plasma volume of the pressure p and the square of the poloidal magnetic field intensity $B_P$, and $\mu_o$ is the vacuum magnetic permeability. For example, when $A < 2/\beta_p$, condition (a) is not always required.

In the case of arbitrarily shaped flux surfaces in axisymmetric tori, Eq. (2) can be written in the easily applied form $$q = \frac{RB_T}{2\pi} \oint \frac{dl}{R^2 B_p} \qquad (3)$$

where $B_T$ is the toroidal and $B_P$ the poloidal magnetic field intensity. The closed line integral, where l is the poloidal arc length, is taken around the flux surface at a constant toroidal angle. The convention used here is that $B_T > 0$ on the elliptic magnetic axis of the reverse field pinch. Thus $q > 0$ on such axis and monotonically decreases with increasing distance from such axis, changing sign at the field reversal point. In the opposite convention, with $B_T < 0$ on such axis, then $q < 0$ on such axis and monotonically increases with increasing distance from such axis. The quantity s appearing in condition (b) above is the magnetic shear, which exerts a stabilizing effect on many classes of instabilities, particularly on ideal MHD interchange instabilities and on many microinstabilities.

Another important property, which enhances stability by suppressing those MHD instabilities that are excited specifically by plasma pressure, is average magnetic well or minimum average B, where B is the magnetic field intensity. A review of the advantages of average magnetic well and of many configurations that have this property is given by H. P. Furth in *Advances in Plasma Physics,* Simon and Thompson, eds., 1 (Interscience Publishers, New York, 1968), pp. 67–100. The average square of the magnetic field intensity $<B^2>$ on a flux surface is calculated by $$<B^2> = \frac{\int B dl}{\int B^{-1} dl} \qquad (4)$$

where the integration is taken by following a magnetic field line for a sufficient distance to sample all of the magnetic surface. The simplest definition of average magnetic well in the limit where the plasma pressure is small is a minimum of $<B^2>$ within the plasma. More generally, an average magnetic wall exists when there is a minimum in $$<B^2> + 2\mu_0 p. \qquad (5)$$

Condition (5) also has a strong correlation to the stability of resistive interchange modes in reverse field pinch configurations. When $<B^2> 2\mu_0 p$ increases with increasing distance from the elliptic magnetic axis, the resistive interchange mode is stable.

Average magnetic well implies that the average of the magnitude of the magnetic field increases outwardly from the center of the device. Therefore, if the plasma is driven outward by an incipient instability, it encounters a stronger magnetic field which opposes its outward motion.

The most commonly used toroidal magnetic confinement configuration at present is the tokamak, whose principal defining characteristic is to satisfy the q stability requirements by operating with $|q| > 1$ and $s \geq 0$ by supplying a sufficiently large toroidal magnetic field intensity $B_T$, in accordance with Eq. (3). Because the aspect ratio A is generally $\geq 3$, the toroidal field, which must be provided by a large toroidal field coil system disposed around the confinement vessel, must be large. Typically, $B_T = 5\ B_P$ to $10\ B_P$. Therefore, the maximum toroidal current $I_p$ flowing in the plasma, which is related to poloidal magnetic field intensity $B_P$ by the formula $B_P = \mu_0 I_p / 2\pi r$, and with it the ohmic heating of the plasma, are limited by the maximum possible toroidal field intensity $B_T$ that can be withstood in a practical magnet system. A small magnetic well, which is also important for tokamak stability, is obtained by toroidal effects. The theoretically predicted maximum plasma pressure that can be confined is limited to $\beta \lesssim 0.10$ and may well be less, where $\beta \equiv \bar{p}(B^2/2\mu_o)$ is the ratio of the volume averaged plasma pressure to the magnetic pressure of the confining field. (Here and throughout the remainder of this disclosure the SI mks system of units is used.) Because of the small $\beta$ of the tokamak, fusion reactor concepts based on it either must be large or must employ extraordinarily high toroidal magnetic field strength.

The toroidal magnetic field produced by the toroidal field coil system is referred to as a vacuum toroidal field when no plasma is present. The toroidal magnetic field then varies inversely with major radius and the quantity of $f \equiv RB_T$ is a constant. When f is independent of which flux surface is under consideration in a region in the plasma, the toroidal magnetic field in that region is said to be a vacuum magnetic field. That is, the toroidal magnetic field in a plasma is similar to a vacuum toroidal magnetic field when $B_T$ varies inversely with R.

Pinches are most readily distinguished from tokamaks, which they superficially resemble, by having $|q| < 1$ everywhere throughout the plasma, and usually they have $|q| << 1$. A toroidal pinch previously known to satisfy the necessary conditions on q is the reversed field pinch (RFP). A recent review of the RFP art has been given by H. A. B. Bodin and A. A. Newton, Nucl. Fusion 20 (1980), pp. 1255–1324. The RFP is a diffuse pinch in which the magnetic field component sensibly parallel to the magnetic axis has a direction in the outside region of the plasma opposite to that in the inner region, and as a result, q(r) passes through zero and changes sign within the plasma. In fact, greatly reduced instability is observed in pinch experiments when the reversed q(r) profile is established. The field and q reversal is achieved by trapping a toroidal field in a pinched plasma and providing external boundary conditions such that a toroidal field of the opposite sign can exist between the plasma and the wall. A conducting shell is also required for stability. The combination of toroidal current and reversed toroidal magnetic field achieved in RFPs produces an equilibrium state of very low free energy, which is stable at low $\beta$. This stability is independent of toroidal effects. Therefore, RFP aspect ratios can be chosen at will to optimize engineering and reactor parameters.

In the RFP the externally acting toroidal field is smaller than $B_P$. Therefore, unlike in the tokamak, $I_p$ is limited only by the maximum intensity of $B_P$ that can be withstood in the device, and large ohmic heating of the plasma is possible. Furthermore, the maximum $\beta$ achievable in RFP devices will be greater than in tokamaks. Therefore, fusion reactor concepts based on the RFP can either be smaller or use lower magnetic fields than with tokamaks.

Unfortunately, the RFP does not possess a magnetic well, and it has been predicted theoretically and observed in computer plasma simulations that an m=0 resistive interchange instability grows into a large convective cell near the q=0 surface and limits plasma confinement. Here m is the poloidal mode number of the instability in question. There are data suggesting that this instability is present in contemporary RFP experiments. Resistive interchange instabilities are among those that can be stabilized by magnetic well.

Multipole plasma confinement devices take a different approach to toroidal plasma confinement. In multipole devices, the toroidal plasma current is replaced by two or more solid conducting rings located internal to the plasma, which produce a set of nested closed magnetic surfaces around each ring. By convention the number of poles is equal to twice the number of conductors. Thus, for example, a device with two internal conductors is termed a quadrupole; four an octopole, etc. Since the current flows through rigid conductors, the current flow is stable. There is no necessity for a strong toroidal magnetic field. The current rings are placed so as to generate a multipolar magnetic field and at least one hyperbolic magnetic axis within the space roughly enclosed poloidally by the rings. A hyperbolic magnetic axis occurs on a flux surface when there are more than two possible directions in which the magnetic field line may be traced. Furthermore, these rings and the hyperbolic magnetic axis or axes are surrounded by an outer set of nested closed magnetic surfaces. The magnetic surface or surfaces passing through the hyperbolic magnetic axis and separating the outer magnetic surfaces from those magnetic surfaces that enclose only a single ring are called separatrix magnetic surfaces. Excellent confinement has been demonstrated in experimental multipole devices. Shear can be added by means of only a small toroidal field.

Mulipole devices have a number of serious difficulties for high temperature plasma and fusion applications associated with the placement of conducting rings internal to the plasma. The rings require support structure, which intercepts charged particles, destroys the symmetry of the device, and leads to reduced confinement of plasma. Alternatively, the support structure can be eliminated by use of superconducting rings which are levitated by use of magnetic fields, but requirements to shield the superconductor from the high energy fusion neutrons are formidable.

It is possible to have a separatrix magnetic surface which encloses two or more current channels, of which one is the plasma and the rest are conductors external to the plasma. In this case the separatrix still encloses two or more sets of nested flux surfaces, however there is plasma in only one set of nested flux surfaces. The hyperbolic magnetic axis occurs on the separatrix where there are the more than two possible directions in which the magnetic field line may be followed. The shape of the nested flux surfaces in a toroidal cross section through the surfaces, referred to as a plasma cross section, is normally a set of concentric circles for a reversed field pinch. If a separatrix is formed near the RFP, the hyperbolic magnetic axis occurs on the separatrix where the flux surface crosses itself. The interface between the plasma and the surrounding vacuum is a magnetic flux surface and is referred to as the plasma surface.

Another confinement principle is shown in the copending application of the present inventor, filed Dec. 14, 1981, for Multipole Pinch Method and Apparatus for Producing Average Magnetic Well in Plasma Confinement. The device there shown can be considered as a multipole device in which the solid internal rings have been replaced by high current pinch plasma current channels. Just as in the solid ring multipole devices, approximately equal currents flowing in parallel through the plasma current channels generate a hyperbolic magnetic axis and separatrix magnetic surfaces internal to the plasma. This produces an average magnetic well, provided the component of magnetic field in the direction of the hyperbolic magnetic axis is not too large in the vicinity of the hyperbolic magnetic axis, which can always be achieved by operating the plasma current channels like reversed field pinches so that q=0 occurs in the vicinity of such hyperbolic magnetic axis.

SUMMARY OF THE INVENTION

The present invention involves a fundamentally different confinement principle, obtaining the best advantages of a magnetic well and high $\beta$ RFP devices. The basic invention can be considered as a small aspect ratio RFP device in which a magnetic well is generated by appropriate shaping of the plasma cross section. A separatrix magnetic surface with at least one hyperbolic magnetic axis is generated either outside or on the plasma surface by currents flowing through exterior coils. By placing the hyperbolic magnetic axis near the plasma surface, in the region between the elliptic magnetic axis and the toroidal major axis, the plasma cross section is distorted inwardly toward the toroidal major axis. The combination of a strongly reversed magnetic field, plasma cross section shaping, and toroidal effects at small aspect ratio produces an average magnetic well. The average magnetic well is created by the variation of $<R>$ on neighboring flux surfaces as in tokamaks. Hereinafter, the magnetic well reversed field pinch is referred to as a reversed field well or RFW.

By definition, the toroidal field is strongly reversed when $|B_T|$ is larger than $|B_P|$ near the plasma surface and $B^2 \approx (B_T)^2$. If $B_T$ is also substantially the same as a vacuum magnetic field, it varies inversely with R. In accordance with the present invention, $|B_T|$ is made larger then $|B_P|$ and is made to vary inversely with R near the plasma surface. Also in accordance with the present invention, the plasma flux surfaces are distorted toward the toroidal axis by the hyperbolic magnetic axis, and the variation of $1/<R>$ is therby most strongly weighted on a flux surface by the points closest to the toroidal axis. Using a small aspect ratio for the device enhances this weighting. Then $<B^2> + 2\mu_0 p$ is dominated by the variation of $B_T$ and is largest on the plasma surface and initially decreases on interior flux surfaces which are further from the toroidal major axis and closer to the elliptic magnetic axis. Going toward the plasma surface from an interior flux surface one sees an increase in $<B^2>+2\mu_0 p$, the indication of an average magnetic well in the plasma.

Pinch plasmas have a strong tendency to keep a nearly circular poloidal cross section. Means are therefore provided to prevent the plasma from coalescing into a circular cross section RFP. Furthermore, the precise shape of the plasma can be adjusted and optimized, if necesary, by means of small currents in toroidal coils exterior to the conducting shell.

Stability in a reversed field pinch with a magnetic well may be obtained by a q profile and conducting shell as in the RFP, plus an average magnetic well as in a tokamak. Since a small aspect ratio is required, A less than about 6, the criteria for kink stability are not as stringent, and it is possible to make an RFW which is kink stable even when $|q|=1$. In general terms, the average magnetic well increases the maximum $\beta$ that can be accommodated. The well in RFW devices is dependent on toroidal effects, and so the toroidal aspect ratio of such devices must be small. Like the RFP, the RFW needs only small toroidal fields; thus, plasma current and ohmic heating are limited only by the maximum poloidal fields that can be withstood in the device.

The device of the present invention is distinctly different from prior art multipole devices in that the magnetic well is achieved without the use of solid rings immersed in the plasma and the problems that such rings entail. It is distinctly different from prior art RFP devices by provision of means to make plasmas with an average magnetic well by plasma cross section shaping and a combination of strong field reversal and small aspect ratio. Furthermore, it is distinctly different from prior art helical pinches as in T. Ohkawa U.S. Pat. No. 4,302,284, sometimes referred to as OHTE, which has multiple hyperbolic magnetic axes at the plasma surface and no magnetic well.

The device of the present invention is also distinctly different from the prior art tokamak devices in that q changes sign in the plasma. A critical difference, from the viewpoint of the efficiency and construction of the device, is that the tokamak current channels require toroidal magnetic fields many times greater than the field produced by the plasma current; whereas in the pinch current channels, the fields are comparable. Furthermore, with a given toroidal field it is possible to drive a much larger current through the present device than through the tokomak device, and the heating associated with this current drastically reduces the auxiliary heating requirements relative to the tokamak device. The RFW device is further differentiated from the tokamak device by their different q profiles. The tokamak q profile is everywhere greater than unity, whereas in the RFW device, q on the elliptic magnetic axis is less than unity, is monotonically varying and passes through zero. Finally, the toroidal field in tokamak devices varies only slightly throughout the plasma volume, whereas in RFW devices it reverses direction between the elliptic magnetic axis and the boundary of the plasma. A preferred RFW device has an induction coil and associated power system designed to induce a toroidal electric field of at least 100 V/m during the plasma pinch formation phase of the discharge cycle; whereas a tokamak device is usually designed to induce a weaker toroidal electric field, such as less than 25 V/m in the Doublet III device at the General Atomic Company.

The device of the present invention is also distinctly different from the multipinch device of the aforesaid copending application in that the RFW has only one current channel and creates the average magnetic well in a completely different fashion. The multipinch average magnetic well occurs because the magnetic field is exactly zero on the hyperbolic magnetic axis lying between the current channels. The RFW average magnetic well occurs at small aspect ratio when the plasma cross section is suitably shaped and the toroidal magnetic field varies substantially like a vacuum magnetic field near the plasma surface. The separatrix occurs either outside or on the plasma surface instead of inside the plasma surface, as in the multipinch.

Thus, it is a primary aspect of the present invention to provide for magnetic confinement of a reversed field pinch plasma with an average magnetic well, particularly as obtained using plasma cross section shaping at small aspect ratio. Other aspects and advantages of the present invention will become evident from the consideration of the following detailed description, particularly when taken in conjunction with the accompanying drawings.

DETAILED DESCRIPTION OF THE INVENTION

Figure 1:
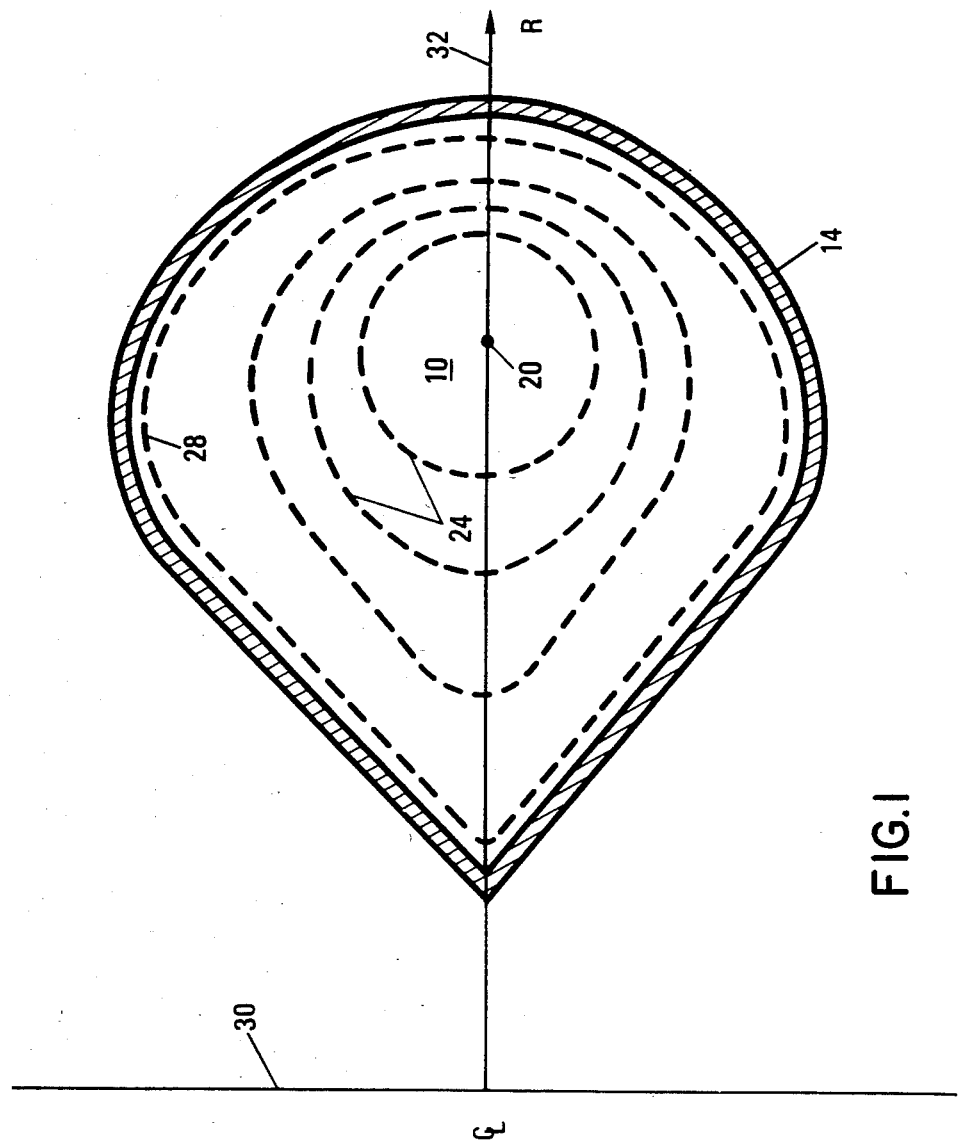
FIG. 1 illustrates the magnetic surfaces obtained when the plasma cross section is appropriately shaped in accordance with a preferred form of the present invention.
Figure 2:
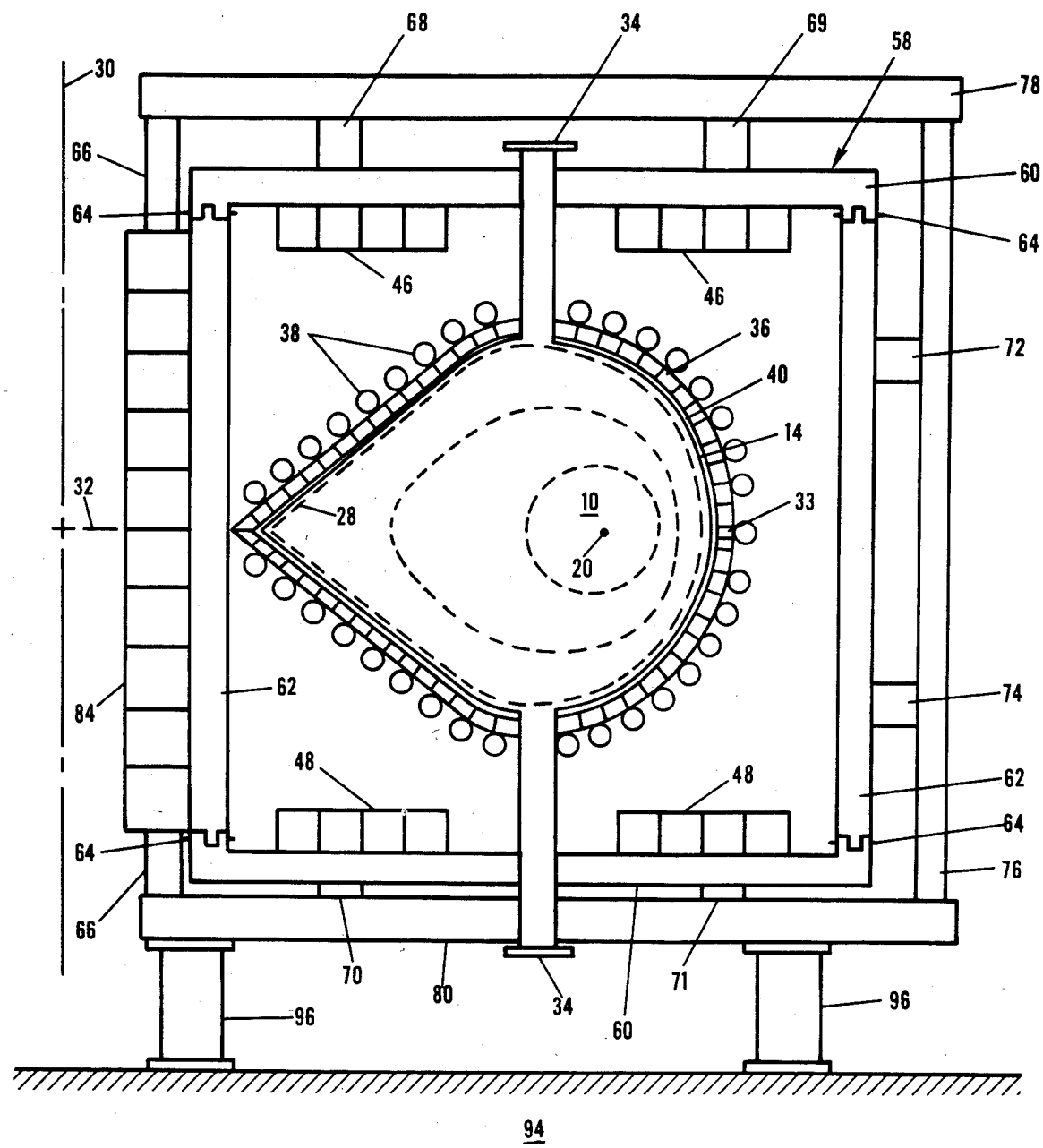
FIG. 2 is a poloidal sectional view of a preferred embodiment of the present invention for generating the magnetic surfaces shown in FIG. 1.
Figure 3:
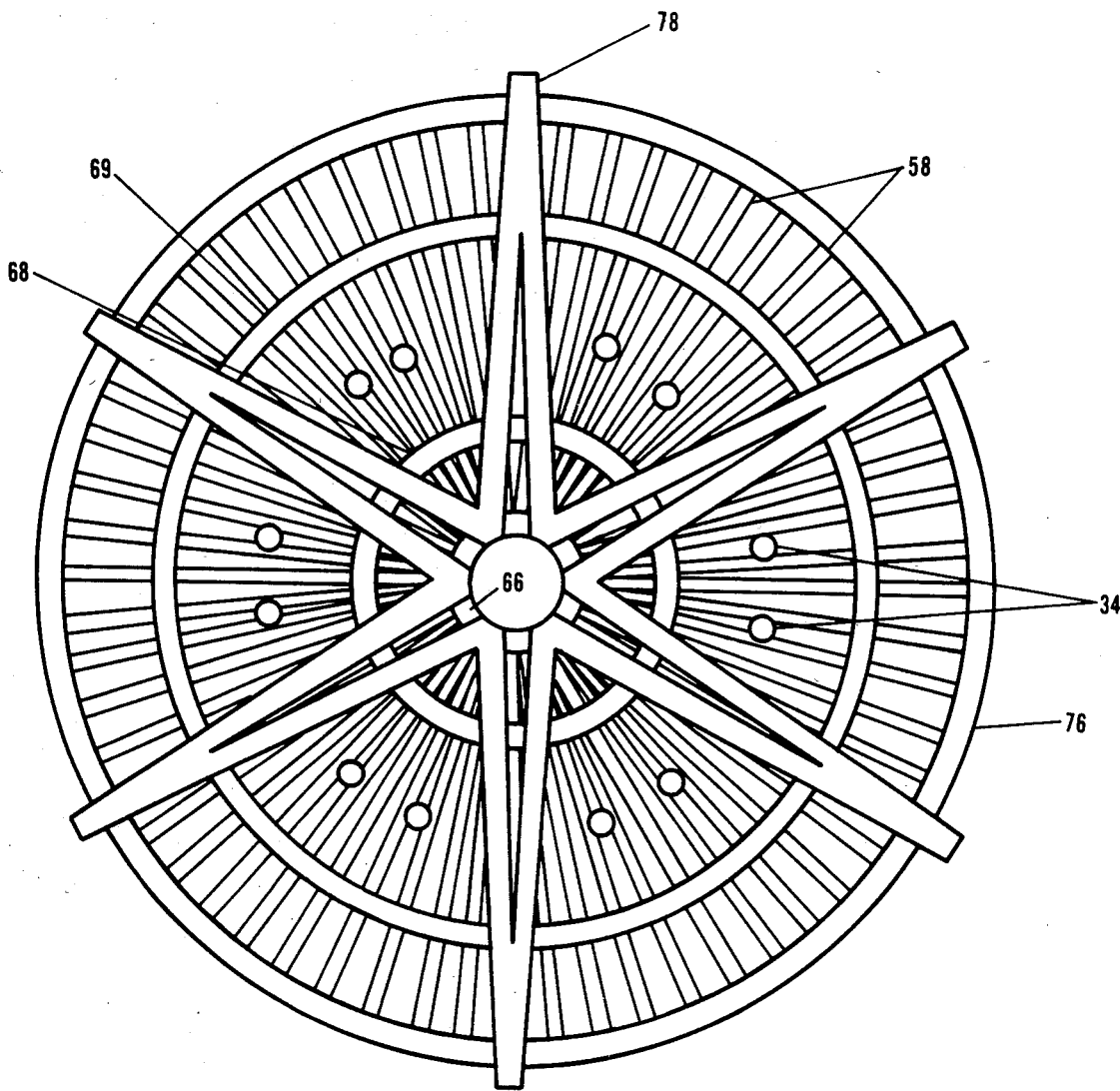
FIG. 3 is a plan view of the apparatus illustrated in FIG. 2.

Central to the concept of the invention is the shaping and control of a toroidal pinch plasma current channel so as to produce an average magnetic well within the plasma utilizing a strongly reversed toroidal magnetic field and an external hyperbolic magnetic axis. The preferred embodiment described herein uses where possible techniques and apparatus that are common knowledge in the art of producing and applying hot, magnetically confined plasmas. A preferred embodiment of the invention for use as a plasma research device is illustrated in FIGS. 2 and 3, such device producing magnetic surfaces as illustrated in FIG. 1. As illustrated in FIGS. 1, 2 and 3, a plasma having one pinch discharge channel 10 is created within a primary vacuum chamber formed by a wall 14 so as to form a teardrop shaped plasma surface 28 and an elliptic magnetic axis 20 with nested closed magnetic surfaces 24. The channel 10 and chamber wall 14 are symmetric with respect to the toroidal major axis 30 and midplane 32.

The average magnetic well is produced in the channel 10 by a combination of four effects. First, the toroidal magnetic field is strongly reversed such that $|B_T| > |B_P|$ on the flux surface 28 and $B^2 \approx B_T{}^2$. Second, a hyperbolic magnetic axis 27 is located on the midplane 32 at the inside edge of a conducting shell 36 where the shell is closest to the toroidal major axis 30. This distorts the flux surface 28 into the teardrop shape. Third, the aspect ratio of the channel is small, $A=2.6$. Fourth, the toroidal magnetic field varies substantially like a vacuum magnetic field on the flux surface 28. The flux surface average of $B^2$ is then dominated by the points closest to the toroidal axis where R is the smallest. $|B_T|$ is largest on the flux surface 28 at the midplane on the side next to the the toroidal major axis 30. $B^2$ is also largest at this point. The distortion of the flux surface by the hyperbolic magnetic axis enhances this effect such that the flux surface average around the surface 28 is also dominated by the points closest to the hyperbolic magnetic axis. Surfaces 24 which are further from the toroidal axis have a smaller value of $B_T$ and a smaller value of $<B^2>$. This is sufficient to make the average magnetic well.

Figure 4A:
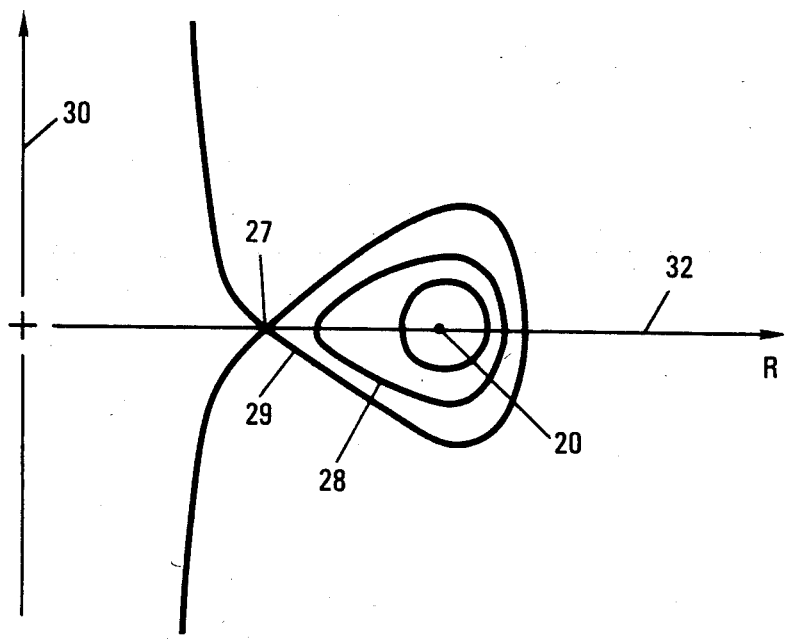
FIGS. 4a and 4b illustrate the flux surfaces for the two simplest arrangements providing hyperbolic magnetic axes near the plasma surface for the generation of plasma shapes with an average magnetic well.
Figure 4B:
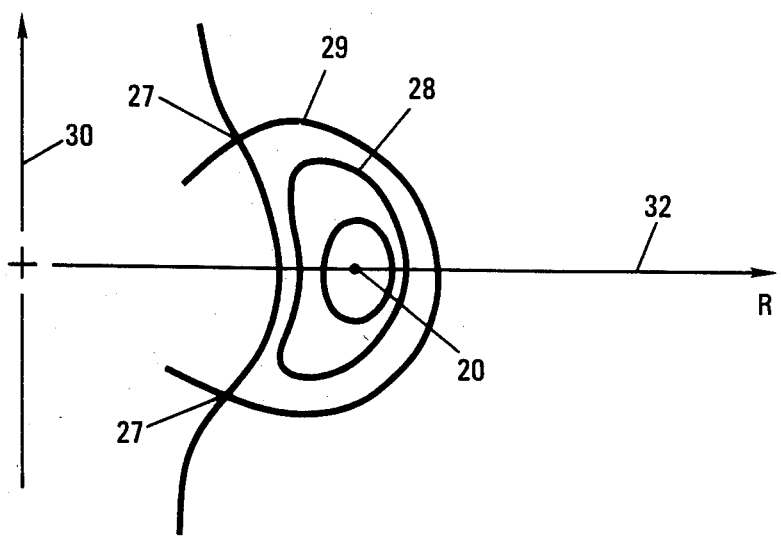

FIGS. 4a and 4b demonstrate alternative locations for hyperbolic magnetic axes 27. FIG. 4a illustrates a flux surface configuration with a single hyperbolic magnetic axis 27, and FIG. 4b illustrates a flux surface configuration with two symmetric hyperbolic magnetic axes 27. FIG. 4a is similar to the configuration shown in FIG. 1. The hyperbolic magnetic axis 27 on a separatrix 29 is located between the elliptic magnetic axis 20 and the toroidal major axis 30 on the midplane 32. The plasma surface 28 is distorted inwardly toward the toroidal major axis 30 by the hyperbolic magnetic axis 27. In FIG. 4b the hyperbolic magnetic axes 27 no longer lie on the midplane 32, but the plasma surface 28 is still distorted inwardly toward the toroidal major axis 30. The flux surface configuration illustrated in FIG. 4a may be formed by the apparatus illustrated in FIGS. 2 and 3. The formation of the flux surface configuration illustrated in FIG. 4b requires a rearrangement of vertical field coils 38 to approximate the shape of the separatrix surface 29.

The hyperbolic magnetic axis 27 is considered close to the plasma surface 28 when it lies within one minor radius of the plasma surface. As the hyperbolic magnetic axis 27 is positioned closer to the plasma surface 28, the amount of distortion of the flux surfaces inwardly toward the toroidal major radius increases. The preferred embodiment illustrated in FIG. 2 has the hyperbolic magnetic axis at the intersection of the shell 36 and the midplane 32 at the point closest to the toroidal major axis 30.

The average magnetic well depth is the difference in the magnitude of $<B^2> + 2\mu_0 p$ between the value at the minimum and the value at the plasma surface. The average magnetic well depth is physically important when it is larger than the mean square of the magnetic field fluctuations, $\Delta B^2$. At aspect ratio 6, the achievable well depth is the same magnitude as the experimentally observed values of $\Delta B^2$. The aspect ratio, therefore, should be less than 6 for an effective well. As A decreases, the achievable well depth increases. The preferred value of A is as small as physically feasible, subject to engineering constraints imposed by induction coils 84, 46, and 48 and toroidal field coils 58. For the preferred embodiment illustrated in FIG. 5a, the well depth is more than three times as large as $\Delta B^2$, and A is 2.6.

As the well depth increases, the magnitude of the safety factor at the plasma surface also increases. For the preferred embodiment illustrated in FIG. 5a, one value of q at the plasma surface is $-3$. For a conducting wall 36 at the position illustrated in FIG. 2, a theoretical analysis of the kink mode using the energy principle predicts that the plasma is stable. This is reasonable as the aspect ratio is less than $2/\beta_p$ for the preferred embodiment of the invention.

Figure 5A:
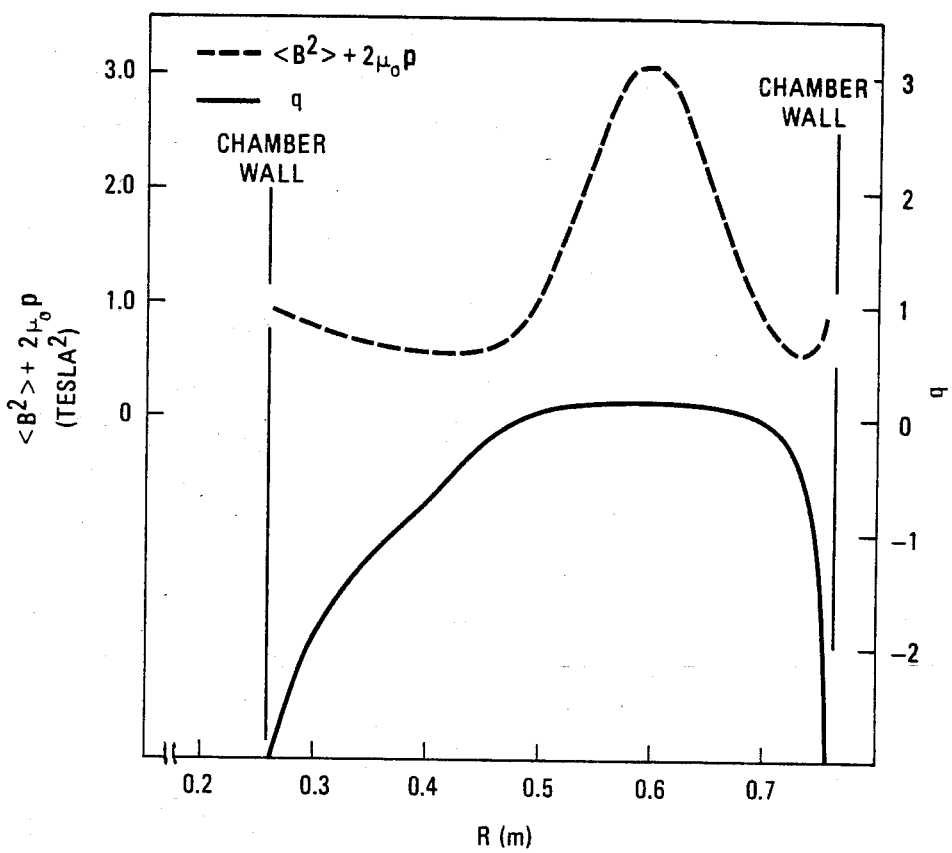
FIGS. 5a and 5b show profiles of average magnetic well $<B^2>+2\mu_0 p$, safety factor q, and the toroidal components of magnetic field $B_T$ and current density $J_T$, as computed from a specific toroidal MHD equilibrium solution corresponding to the apparatus of FIGS. 2 and 3.

As illustrated in FIG. 5a, the minimum value of $<B^2> + 2\mu_0 p$ occurs outside the field reversal point where the safety factor q changes sign. The region of the average magnetic well occurs when $|q|$ is greater than the value of $|q|$ at the elliptic magnetic axis.

The chamber wall 14 may be made of nonmagnetic stainless steel, such as 316 stainless steel, or Inconel alloy, having a thickness of about 0.3 mm. The toroidal resistance of the chamber wall is greater than 5 m$\Omega$, which is sufficiently high to permit penetration of induced toroidal electric field in much less than 1 ms to ionize hydrogen or other gases injected into the chamber at a pressure of about 1 mTorr, and to drive toroidal plasma current. The inside of the wall 14 may be cleaned in situ by a combination of dc glow discharge cleaning and baking to a temperature of about 100° C., or by other effective techniques, to produce an atomically clean surface with a low outgassing rate. Other materials having low electrical conductivity and compatible with high vacuum technique as practiced in fusion devices may also be used. As illustrated, the chamber wall 14 is equipped with a plurality of ports 34 for various purposes, including viewing and making measurements of the plasma and evacuating the chamber to a pressure of $10^{-8}$ Torr. Standard turbomolecular or cryopump vacuum pumping systems, not illustrated, may be used for this purpose. The chamber wall 14 is shaped so as to closely approximate the desired shape of the plasma.

The major radius $R_o$ of a particular exemplary plasma device as illustrated is 0.65 m from the major axis 30 to the elliptic magnetic axis 20. The chamber defined by the wall 14 is 0.48 m high by 0.55 m wide at its widest point. Midplane width of the illustrated embodiment is 0.55 m, but the exact value of this dimension may be changed as desired or required for improved plasma performance with no change in the nature of the invention. Chamber cross sectional dimensions may be scaled to larger or smaller sizes. The major radius of the chamber should be increased or decreased simultaneously with cross sectional dimensions in order to maintain an appropriate small toroidal aspect ratio.

The characteristic boundary shape, whose purpose is to force the formation of the current channel 10 and the teardrop shaped plasma cross section is imparted by the shaped shell 36 and distributed vertical field windings 38. Shaped conducting shells have been used for many years to impart particular shapes to plasmas, with the most similar prior art applications being in internal conductor multipole devices, as in Kerst and Ohkawa U.S. Pat. No. 3,194,739, and in Doublet devices, as in Ohkawa U.S. Pat. No. 3,692,626. See also the aforesaid copending multipinch application. The exact shape of the shell 36 is determined by solution of the Grad-Shafranov equation for MHD equilibrium, to be described in subsequent paragraphs, in order to yield a plasma with the properties sought. At the same time, the shell 36 aids in stabilizing the plasma by repelling, by the method of image currents, any plasma current that tries to move toward the wall 14. In a small plasma research device such as the one illustrated, clearance space 40 between the chamber wall 14 and the shell 36 is approximately 3 mm.

The shaped shell 36 is made of highly conducting metal, such as copper or aluminum, and it is 6 mm thick in the embodiment illustrated in FIGS. 2 and 3. The shell 36 includes a toroidal electrically nonconductive break to prohibit the flow of net toroidal current in the shell, which would otherwise act as a short-circuited secondary circuit for the vertical field windings 38. The break should be insulated to 10 kV to withstand transient voltages. A similar poloidal electrically nonconductive break 33 is provided to allow penetration of toroidal flux during aided toroidal magnetic field reversal. This decreases the required flux swing of an induction air coil 84 for driving toroidal current.

The chamber wall 14 alone is too thin to withstand atmospheric pressure without collapsing. Therefore, after the chamber has been aligned in its correct position within the shell 36, as; for example, by means of small electrically insulating spacers, the clearance space 40 is filled with a liquid silicone mixture that can be cured in situ to an elastic, solid adhesive silicone rubber, bonding the chamber wall 14 and the shell 36 firmly together. Thus, it is the shell 36, and not the thin chamber wall 14, that resists atmospheric pressure. Silicone rubbers are available that easily withstand 100° C., the maximum bulk wall temperature during baking and cleaning. The maximum wall temperature rise expected when 100 kJ of energy is deposited uniformly on the wall during a test discharge is only 20° C.

The induction coils 84, 46, and 48 induce a toroidal electric field to ionize gas within the chamber 14, thereby making plasma, and drive sufficient toroidal current through the plasma to heat it resistively to high temperature. The poloidal magnetic field created by the pinch current also contributes the majority of the magnetic confinement of the hot plasma through the pinch effect, and therefore such current must be sustained for the desired duration of plasma confinement. The induction air coil 84 provides the flux swing required to drive the toroidal current. This aspect of the device and the basic design considerations thereof are the same in the present invention as in RFP, tokamak and other ohmically heated toroidal plasma devices.

The vertical field coils 38 supplement the shell 36 in shaping the plasma. Because magnetic flux diffuses through a shell of thickness w, minor half width b and electrical conductivity $\sigma$ in a time $\tau_{shell}$ given by $$\tau_{shell} = \mu_0 \sigma w b/2, \quad (6)$$

its power to control the shape of the plasma is lost after this time. For the device illustrated in FIGS. 2 and 3, $\tau_{shell} = 18$ ms. However, plasma shape can also be accurately controlled by means of current distributed in external conductors, so as to provide magnetic boundary conditions identical to those of the shell. These conditions include also the so-called vertical field, which counteracts the tendency of the toroidal plasma to expand in major radius. Shaping by external coils has been demonstrated in both the Doublet II-A and Doublet III experiments. In FIG. 2, the individual turns of the vertical field coils 38 are shown with a distribution that achieves the desired purpose. An infinitude of such distributions may be found, but the most efficient shaping is obtained when the windings are located close to the shaped shell 36, as illustrated. Satisfactory designs may also be obtained with a different number of turns than illustrated. Thus, the transition from plasma shaping by image currents in the shell 36 to shaping by the magnetic field produced by the special distribution of the current conductors of the vertical field coils 38 is made smoothly, and the duration of the plasma is not limited by $\tau_{shell}$.

The induction coils 84, 46, and 48 are energized in a conventional manner. For example, if coils 84, 46, and 48 are connected in series, a capacitor bank charged to 20 kV will induce an electric field of 245 V/m in the toroidal direction. Such an electric field has been found to be more than adequate to establish hot plasmas in RFP experiments of similar size.

The vertical field coils 38 also provide a more flexible degree of control over the shape and position of the plasma. The principle is similar to that used to shape plasmas in Doublet IIA and Doublet III experiments. Each coil may be energized independently of the other windings, for example, by means of a thyristor chopper power supply. In this case the vertical field coils 38 are referred to as trim coils. The trim coils can be made to perform their functions in negative feedback loops by the addition of magnetic field pickups around the periphery of the plasma to sense the state of the field and react through suitable amplifiers to control the thyristor choppers or other power supplies.

A plurality of toroidal field coils 58 are disposed about the plasma, chamber wall 14, shell 36, vertical field coils 38 and induction coils 46 and 48, in order to produce the toroidal magnetic field required for stable pinch operation. The maximum toroidal field intensity to be supplied is substantially less than that required in tokamak plasmas, such as the Doublet III experiment. If the embodiment illustrated in FIGS. 2 and 3 carries 300 kA of toroidal plasma current, then the toroidal field coils need supply only the modest field strength of 1.0 T or less. Thus, almost any conventional toroidal field coil design may be used. The preferred design facilitates disassembly for easy access to the induction coil, shell and chamber. The example of the design illustrated employs copper conductors 60 and 62 of rectangular cross section, 0.014 m by 0.04 m, which are joined with bolted joints 64 into a 60-turn coil uniformly encircling the toroidal components. Sixty turns is a sufficient number so that ripple in the toroidal field strength from the discreteness of the coil conductors is not a problem.

The toroidal field coils 58 are aligned by cylinders 66 and rings 68, 69, 70, 71, 72 and 74, which are electrically insulating and may be of fiber glass or other reinforced plastic composite. Vertical members 76 and the cylinders 66, together with radial beams 78 and 80, clamp the toroidal field coils firmly in place. The cylinders 66 also react the radial compressive force exerted by the toroidal magnetic field on the coils 58, while the rings 72 and 74 reinforce the toroidal field coils 58 against bending outwardly in the direction of the major radius. The rings 68, 69, 70, and 71 position and support the coils 58 in the vertical direction. The rings 68, 69, 70, and 71 are in turn supported by the radial beams 78 and 80, which are also preferably made of plastic composite. Stiffness against overturning moments in the toroidal field coils 58, which arise from the cross force between the vertical magnetic field component from the vertical field coil 38 and current in the toroidal field coils, is provided by the cylinders 66 and the diagonal arrangement of the radial beams 78 and 80, as seen in FIG. 3. The toroidal field coils 58 are energized by external means not shown, for example by a pulsed dc rectifier system or, in smaller research experiments, by a capacitor bank. A current of 20.8 kA through the copper conductor is sufficient to generate 1.0 T.

The induction air coil 84 of the example provides the flux swing for driving the toroidal current. The outer radius of the air coil 84 illustrated is 0.15 m. When constructed of conventional hardened copper, the flux swing possible in the core is greater than 0.7 Wb, whereas extrapolation of RFP experimental data indicates that only about 0.35 Wb are necessary to form a 300 kA pinch plasma of this size. The remaining 0.35 Wb of flux can be used to sustain the plasma current once established until the flux is consumed by plasma resistance.

The air coil 84 is supported by the lower cylinder 66 on the beams 80. The torus assembly, comprising the chamber wall 14, shell 36, vertical field coil 38, induction coils 46 and 48, and toroidal field coils 58, is supported on columns 96. The central air coil 84 is concentric with the major axis 30 of the torus assembly.

As mentioned in the aforesaid copending multipinch application, the general behavior of the pinch plasmas containing at least a small toroidal magnetic field was successfully explained by J. B. Taylor, Phys. Rev. Lett. 33 (1974), p. 1139–1141. Such a plasma contains magnetic helicity K, defined by $$K = \int \vec{A} \cdot \vec{B} \, dV \tag{7}$$

where $\vec{B}$ is the magnetic field, $\vec{A}$ is the magnetic vector potential defined such that $\nabla \times \vec{A} = \vec{B}$ and $\vec{A} = 0$ at the conducting shell, and the integration is over the enclosed toroidal volume. According to Taylor, a plasma can lose energy, through plasma instabilities, much more rapidly than magnetic helicity, even if the plasma has finite resistivity. Therefore, a plasma sheds its excess energy rapidly while virtually conserving its initial helicity, until the minimum energy state compatible with the fixed K and the geometry of the toroidal shell is attained. This is called a relaxed state, and it is stable to both ideal and resistive MHD instabilities because no more free energy is available unless K is changed. Taylor showed that the relaxed state obeys the condition $$\mu_o \vec{J} = \nabla \times \vec{B} = \mu \vec{B} \tag{8}$$

where $\vec{J}$ is the current density and $\mu$ is a constant with dimensions of (length)$^{-1}$. Plasmas obeying Eq. (8) have no pressure gradient, because $\nabla p = \vec{J} \times \vec{B}$, and are therefore force free. The solutions to Eq. (8) are particularly simple for very large aspect ratio tori with a circular cross section. The lowest order mode is then $$B_P = B_o J_1(\mu r)$$

$$B_T = B_o J_o(\mu r) \tag{9}$$

where $J_o$ and $J_1$ are the Bessel functions, r is the minor radius measured from the minor axis of the torus, and $B_o$ is the field strength on this axis. Subscripts P and T refer to poloidal and toroidal directions respectively. When $|\mu r| > 2.405$, the first root of $J_o$, the toroidal field reverses.

Taylor's relaxation theory describes the principal features of circular cross section RFP plasmas as observed in experiments. In particular, plasmas tend to approach the configuration described by Eq. (9) independently of their initial state and the particular method used to produce them. Real plasmas differ slightly from the ideal Taylor states because of inevitable limitations, and therefore a low level of residual instability and turbulence is still observed in all recent pinch experiments. These limitations are principally:

1. Real plasmas must have finite pressure; furthermore, substantially high pessures are desired for fusion applications.

2. $\vec{B}$, and therefore $\vec{J}$ in accordance with Eq. (8), are always large in Taylor states. Near the bounding shell, real plasmas are cold and hence have high resistance, and thus they are unable to carry the large current prescribed by Taylor states in this boundary region.

As with the multipole pinch invention of the aforesaid copending application, a principle aspect of the present invention, stated in the context of the preceding discussion, is to surround a central plasma, which can closely approximate a Taylor equilibrium, with a magnetic well. The additional stabilizing effect of the well acts to prevent, or at least to reduce, instabilities arising from the pressure of the plasma and from the low current boundary region. This is achieved in a RFW configuration with a teardrop shaped cross section as illustrated in FIGS. 1, 2, and 3.

Corresponding to the multipole pinch method of the aforesaid copending application, in the RFW the most straightforward method to produce plasmas approximating a desired Taylor state is:

1. A conducting metal shaping shell is constructed whose shape is substantially identical with the shape of the desired plasma surface.

2. Prior to formation of the plasma, a toroidal magnetic field is established within the enclosed, evacuated toroidal volume by suitable toroidal field coil means. The strength of this field is chosen so that it provides a toroidal magnetic flux within the shell equal to the toroidal flux of the desired plasma state.

3. The gas that will be ionized into plasma is injected, using any conventional means. Optionally, the gas may be preionized.

4. A toroidal electric field is induced around the torus by an external induction coil. A large electric field, typically >100 V/m, is needed initially to ionize the gas completely and drive the toroidal current to the level of the desired state.

5. Once established, the desired state is sustained by decreasing the induced electric field to a value just adequate to maintain the toroidal current flowing through the electrical resistance of the plasma, typically ≦10 V/m. Gas may be let into the chamber slowly to replenish gas adsorbed by the metal walls, as is now customary in the plasma art.

6. The shape of the flux surface does not change radically as the mode amplitude ratio is changed. Therefore, a single shaping shell 36 can be used to study a continuum of neighboring equilibria by magnetically trimming the boundary conditions by means of small currents through the vertical field coils 38 external to said shell.

7. Because no transformer can induce an electromotive force idefinitely, the plasma discharge will eventually terminate. The duration of the discharge is increased as the possible flux change of the transformer is increased.

Axisymmetric toroidal plasma equilibria with finite plasma pressure and a general specific toroidal current density $J_T=J_T(\Psi)$ may be calculated by solving the Grad-Shafranov equation:

$$\nabla^2\Psi = -\mu_o R J_T \quad (10)$$

where
R = radial distance from the major axis 30
z = vertical distance from the midplane 32
$\Psi/2\pi$ = poloidal flux $$\nabla^2 = \frac{\partial^2}{\partial R^2} - \frac{1}{R}\frac{\partial}{\partial R} + \frac{\partial^2}{\partial z^2}$$

Furthermore, $$B_R = \frac{1}{R}\frac{\partial \Psi}{\partial z}, B_z = -\frac{1}{R}\frac{\partial \Psi}{\partial R} \quad (11)$$

$$B_p = (B_R^2 + B_z^2)^{\frac{1}{2}}, B_T = \frac{f(\Psi)}{R} \quad (12)$$

$$J_T = \frac{B_T}{\mu_o}\frac{df}{d\Psi} + R\frac{dp}{d\Psi} \quad (13)$$

$$J_p = \frac{B_p}{\mu_o}\frac{df}{d\Psi} \quad (14)$$

where $J_P$ is the poloidal current density and $B_R$ and $B_z$ are the components of the magnetic field in cylindrical coordinates.

Figure 5B:
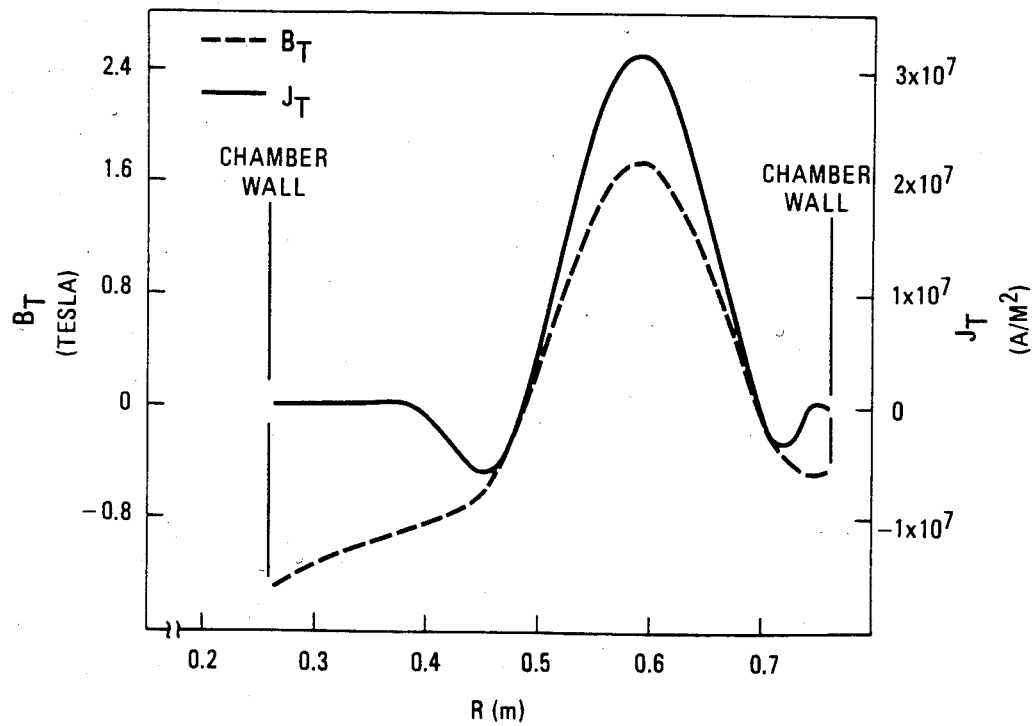

The pressure and toroidal field functions $p(\Psi)$ and $f(\Psi)$ may be specified arbitrarily. However, not all such equilibrium solutions are stable. Taylor states obeying Eq. (8) are stable as pinches within a conducting shell. Toroidal Taylor states are obtained from Eqs. (10) through (14) and $dp/d\Psi=0$ and $df/d\Psi=\mu$, Taylor's parameter. Realistic deviations from the ideal Taylor state can be included by using finite pressure and a $df/d\Psi$ that is virtually constant in the interior plasma and becomes small or zero at the edge, thereby forcing $\bar{J}$ to do the same in accordance with Eqs. (13) and (14). The magnetic flux surfaces of FIG. 1 are drawn from a numerical solution of the Grad-Shafranov equation with finite pressure, but with $df/d\Psi=\mu_c(1-\bar{\Psi}^n)$, $\bar{\Psi}=(\Psi_c-\Psi)/(\Psi_c-\Psi_b)$, where $\Psi_c$=central value of $\Psi$ (at the elliptic axis), and $\Psi_b$=boundary value of $\Psi$. For FIG. 1 the aspect ratio A is 2.6, $\mu_c=5.7/a$, $dp/d\Psi\neq 0$ and n=7. The exponent n=7 yields Taylor-like $\bar{J}/\bar{B}$ almost to field reversal, but the current is rapidly attenuated outside of reversal. Plots of q, $B_T$, $J_T$ and $<B^2>+2\mu_o p$ derived from this numerical solution are given in FIGS. 5a and 5b as a function of R through the elliptic axis 20 for $R_o=0.65$ m and $I_p=300$ kA, which are the parameters for the example of the apparatus shown in FIGS. 2 and 3. The toroidal field is strongly reversed, which yields the RFP-like reversed q profile. The local minima in $<B^2>+2\mu_o p$ seen in FIG. 5a are evidence of the averge magnetic well. Thus, the desired magnetic well is obtained with a realistic plasma current distribution with finite pressure by means of the present invention, utilizing plasma cross section shaping and a combination of strongly reversed toroidal magnetic field and small aspect ratio.

The occurrence of average magnetic well in the RFW can also be explained in simplified qualitative terms. It is a consequence of axisymmetry that the toroidal field-major radius product $B_T R$ remains a constant on any given magnetic surface. This condition is stated in Eq. (12). In the most common present art toroidal magnetic confinement systems, namely the tokamak and stellarator families, the toroidal field greatly exceeds the poloidal, and therefore average magnetic well can only be obtained by varying the relative average major radius positions $<R>$ of neighboring magnetic surfaces. For the small aspect ratio reversed field pinch, the teardrop shape of the embodiment illustrated in FIGS. 1, 2, 3 and 4a allows a similar variation of average major radius position $<R>$ of neighboring magnetic surfaces. When $|B_T|>|B_P|$ near the plasma surface is the RFW, $B^2\approx B_T^2$ and the variation in $<R>$ produces the average magnetic well.

It is advantageous to operate the present invention with the ratio of toroidal plasma current and magnetic field, or the parameter $\mu$ of the pinch current channels in terms of Taylor's theory, such that the toroidal field is reversed over approximately the outer one third of the flux surfaces. This gives a reversed toroidal field near the plasma surface which is larger than the poloidal field. The variation in $<R>$ of neighboring magnetic surfaces of the teardrop shape then creates the magnetic well. This is shown in FIG. 5a. The presence of the minima in the plot of $<B^2>+2\mu_o p$ indicates the presence of an average magnetic well in the plasma. The relative positions of reversal and well may be varied to obtain the best plasma confinement for a particular construction as determined empirically.

In prior art RFP confinement a conducting shell close to the plasma has been considered a necessary requirement for plasma stability. The primary role of the shell is to resist by the image current effect the long wavelength kink instabilities of the plasma, which can quench the hot plasma against the chamber wall of the apparatus. However, image currents decay exponentially at a characteristic rate approximately equal to $\tau_{shell}^{-1}$. It is, therefore, anticipated that RFP discharges lasting longer than about $\tau_{shell}$ may require a complex feedback system to prevent said kink instability. However, the external field, particularly that portion generated by currents in vertical field coil conductors near the midplane 32, resists displacements of the plasma current channel 10 in both z and R directions. Therefore, it may prove possible to eliminate conducting shell 36 under some conditions without suffering from plasma instability, gaining thereby greater design flexibility and simpler apparatus. In this case the shaping of the plasma into the RFW pinch configuration would be entirely by means of the external coils 38 or equivalents thereof.

The present invention therefore provides a method and apparatus for making magnetically confined toroidal plasmas of the reversed field pinch variety with a bounding average magnetic well. The present invention closely approximates an ideal stable Taylor pinch state. The location of the average magnetic well according to the present invention is such as to exert a stabilizing influence on instabilities driven by the pressure of the plasma, particularly in the outer one third of the plasma volume. The location of the average magnetic well is also favorable for the amelioration of effects arising out of the reduced plasma currents near the plasma boundary compared to the ideal stable Taylor state. Therefore, advantages of greater stability and/or greater $\beta$, generically termed improved plasma confinement, may be expected compared with prior art RFP devices which do not have an average magnetic well.

While the novel aspects of a magnetic confinement plasma device in accordance with the present invention have been shown in a preferred embodiment, many modifications and variations may be made therein within the scope of the invention, as in the size, shape, and current and field intensities, as well as in application of alternate methods and techniques well known in the art of plasma and fusion. For example, the vertical field coils 38 may be designed to operate with an iron core, and the number of hyperbolic magnetic axes may be increased. Furthermore, the conducting shell 36 may be constructed of separated upper and lower halves electrically insulated from each other at their midplane interface, which would allow operating the pinch in the well-known prior art aided reversal mode if desired. The device may also include various well-known appurtenances of plasma and fusion devices such as power supplies, vacuum pumps, instrumentation, blankets, heat exchangers, supporting structures and control systems. The particular embodiment described is designed for experimental and research purposes. Scaled-up embodiments intended for the production of fusion and power will likely require these and other appurtenances.

What is claimed is:

1. A method for generating and containing plasma in a reversed field pinch with a magnetic well, said method comprising:
   generating toroidal plasma in a toroidal chamber having a major toroidal axis and a minor toroidal axis and a small aspect ratio;
   passing current through said plasma in the direction in which said minor toroidal axis extends to form a strongly reversed magnetic field pinch configuration therein which generates a set of nested closed magnetic flux surfaces defining an elliptic magnetic axis within said plasma extending in the direction of current flow and produces a safety factor q which changes sign within said plasma at the flux surface where the component of the magnetic field in the direction in which said minor toroidal axis extends changes sign; and
   generating at least one hyperbolic magnetic axis outside substantially all of said plasma and between said elliptic magnetic axis and said major toroidal axis to form an average magnetic well encompassing substantially all of said plasma.

2. The method according to claim 1 wherein the forming of an average magnetic well includes making the component of the magnetic field in the direction in which said minor toroidal axis extends substantially the same as a vacuum magnetic field within said plasma outside said flux surface on which magnetic field reversal occurs.

3. The method according to claim 1 wherein said aspect ratio is less than about 6.

4. The method according to claim 1 wherein said at least one hyperbolic magnetic axis and said elliptic magnetic axis are substantially coplanar.

5. The method according to claim 2 wherein said aspect ratio is less than about 6.

6. The method according to claim 2 wherein said at least one hyperbolic magnetic axis and said elliptic magnetic axis are substantially coplanar.

7. The method according to any one of claims 1 to 6 wherein said at least one hyperbolic magnetic axis lies close to the plasma surface to deform the surface toward said toroidal major axis.

8. The method according to claim 7 wherein said well is formed substantially at a said magnetic flux surface within said plasma where the safety factor q is substantially less than zero.

9. The method according to claim 8 wherein said magnetic flux surfaces are shaped and positioned by means external to said plasma.

10. The method according to claim 7 wherein said well is formed substantially at a said magnetic flux surface within said plasma where the absolute value of the safety factor q is greater than its absolute value anywhere within said magnetic flux surface on which magnetic field reversal occurs.

11. The method according to claim 10 wherein said magnetic flux surfaces are shaped and positioned by means external to said plasma.

12. The method according to claim 7 wherein said magnetic flux surfaces are shaped and positioned by means external to said plasma.

13. The method according to any one of claims 1 to 6 wherein said magnetic flux surfaces are shaped and positioned by means external to said plasma.

14. The method according to any one of claims 1 to 6 wherein said well is formed substantially at a said magnetic flux surface within said plasma where the safety factor q is substantially less than zero.

15. The method according to claim 14 wherein said magnetic flux surfaces are shaped and positioned by means external to said plasma.

16. The method according to any one of clams 1 to 6 wherein said well is formed substantially at a said magnetic flux surface within said plasma where the absolute value of the safety factor q is greater than its absolute value anywhere within said magnetic flux surface on which magnetic field reversal occurs.

17. The method according to claim 16 wherein said magnetic flux surfaces are shaped and positioned by means external to said plasma.

18. Apparatus for generating and containing plasma with a magnetic well reversed field pinch, said apparatus comprising:
    means defining a toroidal chamber having a major toroidal axis and a minor toroidal axis and a small aspect ratio;
    means for generating a plasma within said chamber;
    means for passing current through said plasma in the direction in which said minor toroidal axis extends to form a strongly reversed magnetic field pinch configuration therein which generates a set of nested closed magnetic flux surfaces defining an elliptic magnetic axis within said plasma extending in the direction of current flow and produces a safety factor q which changes in sign within said plasma at a said magnetic flux surface where the component of the magnetic field in the direction in which said minor axis extends changes sign; and
    means for generating at least one hyperbolic magnetic axis outside substantially all of said plasma and between said elliptic magnetic axis and said major toroidal axis to form an average magnetic well encompassing substantially all of said plasma.

19. Apparatus according to claim 18 wherein said chamber and plasma current are substantially axisymmetric about the major axis of said chamber.

20. Apparatus according to claim 18 including means external to the plasma for shaping and positioning said magnetic flux surfaces.

21. Apparatus according to claim 20 wherein said means for shaping and positioning includes an electrically conducting shell of the shape desired for said plasma.

22. Apparatus according to claim 20 wherein said means for shaping and positioning includes vertical field coils.

23. Apparatus according to any one of claims 18 to 22 wherein said aspect ratio is less than about 6.

24. Apparatus according to any one of claims 18 to 22 including means for forming said well substantially at a said magnetic flex surface within said plasma where the safety factor q is substantially less than zero.

25. Apparatus according to claim 24 wherein said aspect ratio is less than about 6.

26. Apparatus according to any one of claims 18 to 22 including means for forming said well substantially at a said magnetic flux surface within said plasma where the absolute value of the safety factor q is greater than its absolute value anywhere within said magnetic flux surface on which magnetic field reversal occurs.

27. Apparatus according to claim 26 wherein said aspect ratio is less than about 6.

28. Apparatus according to any one of claims 18 to 22 wherein said means for generating at least one hyperbolic magnetic axis is operable to generate such axis within one minor radius of the plasma surface to deform the plasma surface toward said major toroidal axis.

29. Apparatus according to claim 28 wherein said aspect ratio is less than about 6.

30. Apparatus according to any one of claims 18 to 22 wherein said means for generating at least one hyperbolic magnetic axis is operable to generate such axis substantially coplanar with said elliptic magnetic axis.

31. Apparatus according to claim 30 wherein said aspect ratio is less than about 6.

32. A magnetic well reversed field punch plasma device comprising wall means forming a toroidal chamber having a major toroidal axis and a minor toroidal axis and a small aspect ratio; and means for generating plasma within said chamber and maintaining a safety factor q which changes sign within said plasma and for producing an average magnetic well encompassing substantially all of said plasma, including means for passing current through said plasma in a pinch current channel disposed within said plasma and extending in the direction in which said minor toroidal axis extends, said channel containing a set of nested closed magnetic surfaces defining an elliptic magnetic axis in the direction of current flow, and means for generating at least one hyperbolic magnetic axis outside substantially all of said plasma and between said channel and said major toroidal axis.

* * * * *

UNITED STATES PATENT AND TRADEMARK OFFICE
CERTIFICATE OF CORRECTION

PATENT NO. : 4,560,528
DATED : December 24, 1985
INVENTOR(S) : Tihiro Ohkawa

It is certified that error appears in the above-identified patent and that said Letters Patent is hereby corrected as shown below:

Column 2, line 58, delete "$\phi$".

Column 4, line 1, change "$\langle B^2 \rangle 2\mu_o p$" to "$\langle B^2 \rangle + 2\mu_o p$".

Column 14, line 68, change "specific" to --specified--.

Column 15, line 34, change "and", first occurrence, to --when--.

Column 15, line 55, change "averge" to --average--.

Column 20, line 9, change "punch" to --pinch--.

Signed and Sealed this

Sixth Day of May 1986

[SEAL]

Attest:

DONALD J. QUIGG

Attesting Officer

Commissioner of Patents and Trademarks